(12) United States Patent
Wang

(10) Patent No.: US 8,157,281 B2
(45) Date of Patent: Apr. 17, 2012

(54) DRIVING MECHANISM AND A BICYCLE USING THE SAME

(75) Inventor: Shu-Ling Wang, Taichung (TW)

(73) Assignee: Sung-Hua Wang, Taichung (TW)

(*) Notice: Subject to any disclaimer, the term of this patent is extended or adjusted under 35 U.S.C. 154(b) by 170 days.

(21) Appl. No.: 12/704,516

(22) Filed: Feb. 11, 2010

(65) Prior Publication Data

US 2010/0253037 A1  Oct. 7, 2010

(30) Foreign Application Priority Data

Apr. 3, 2009 (TW) .............................. 98111095 A

(51) Int. Cl.
*B62M 1/02* (2006.01)
*B62M 1/04* (2006.01)

(52) U.S. Cl. ........................................ 280/256; 280/259

(58) Field of Classification Search .................. 280/261, 280/262, 259, 260, 247, 256, 221; 74/594.3
See application file for complete search history.

(56) References Cited

U.S. PATENT DOCUMENTS

| | | | | |
|---|---|---|---|---|
| 284,612 A | * | 9/1883 | Charsley | 280/235 |
| 1,277,161 A | * | 8/1918 | Weber | 74/47 |
| 1,424,497 A | * | 8/1922 | Lo Verde et al. | 280/256 |
| 2,168,110 A | * | 8/1939 | Eugen | 280/256 |
| 5,172,926 A | * | 12/1992 | Mannino | 280/252 |
| 5,566,589 A | * | 10/1996 | Buck | 74/594.1 |
| 7,007,570 B2 | * | 3/2006 | Gayoh | 74/594.3 |
| 2003/0040404 A1 | * | 2/2003 | Maresh | 482/51 |
| 2007/0235974 A1 | * | 10/2007 | Vargas | 280/256 |
| 2011/0049830 A1 | * | 3/2011 | Hung | 280/256 |

* cited by examiner

*Primary Examiner* — Anne Marie M Boehler

(57) ABSTRACT

A driving mechanism of the present invention includes a transmission disc, a transmission belt, a pair of cranks, a pair of arms, a pair of connecting bodies and a pair of pedals. The cranks and the arms are disposed on the frame of a bicycle, and the connecting bodies are disposed between distal ends of the cranks and the arms. Each pedal is disposed on the connecting body and is movable in an orbit. A vertical distance between the topmost point and the bottommost point of the orbit is H, and a horizontal distance between the front most point and a rearmost point is W, which satisfies the following relationship: $H/W \geq 5/3$.

14 Claims, 6 Drawing Sheets

DRIVING MECHANISM AND A BICYCLE USING THE SAME

BACKGROUND OF THE INVENTION

1. Field of the Invention

The present invention relates to a driving mechanism for a bicycle and a bicycle using the same.

2. Description of the Prior Art

A conventional bicycle mainly includes a frame, a front wheel and a rear wheel. The front wheel and the rear wheel are disposed on a front fork and a rear fork of the frame respectively. A driving mechanism of the bicycle includes a chainwheel disposed on a seat tube of the frame, a pair of cranks disposed at the center of the chain wheel, a pair of pedals disposed on distal ends of the cranks, and a chain partially surrounding the chainwheel for driving the rear wheel. As such, the user can step on the pedals to rotate the chainwheel, and to further riding the bicycle forward.

However, the traveling orbit of the pedal is substantially a regular circle, thus the user's feet have to exercise in the circular traveling orbit. As a result, the distance between the front wheel and the rear wheel cannot be shortened since it takes place for the user's feet to exercise. Further, the length of the whole bicycle is inevitably longer, and thus the bicycle may have storage disadvantages.

A collapsible bicycle is known to the public to mitigate the above-mentioned disadvantages, hence the length of the folded bicycle is expected to be about half its extended length. Although the length thereof can be shortened, such collapsible bicycle cannot be ride once it is folded.

Therefore, the present invention is arisen to mitigate the above-mentioned disadvantages.

SUMMARY OF THE INVENTION

The main object of the present invention is to provide a driving mechanism that helps shorten the length of a bicycle.

To achieve the above and other objects, a driving mechanism of the present invention includes a transmission disc, a transmission belt, a pair of cranks, a pair of arms, a pair of connecting bodies and a pair of pedals. The transmission disc is disposed on a frame of a bicycle. The transmission belt partially surrounds the transmission disc, and the transmission belt and disc are in an operative relationship. The transmission belt is adapted to drive the front wheel or the rear wheel. The cranks are disposed on both sides of the bicycle. Each crank has a crank fixed end and a crank distal end. The crank fixed ends are connected by an axle, which inserts through a center of the transmission disc. The cranks and the transmission disc are in an operative relationship, and each crank is rotatable about its crank fixed end. The arms are disposed on both sides of the bicycle, and each arm has an arm fixed end and an arm distal end. The arm fixed ends are pivoted to the frame. Each connecting body has two pivoting ends, which are pivoted to the crank distal end of the crank at the same side and the arm distal end of the arm at the same side respectively. Each connecting body further has a connecting portion located between its two pivoting ends. The pedals are disposed on the connecting portions respectively. Each pedal is movable in an orbit, which has a topmost point, a bottommost point, a front most point and a rearmost point. A vertical distance between the topmost point and the bottommost point is H, and a horizontal distance between the front most point and the rearmost point is W, which satisfies the following relationship:

$$H/W \geq 5/3.$$

As such, the horizontal distance of the traveling orbit of the user's feet can be significantly reduced. Hence the distance between the front and rear wheels, as well as the full length of the bicycle, can also be shortened.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
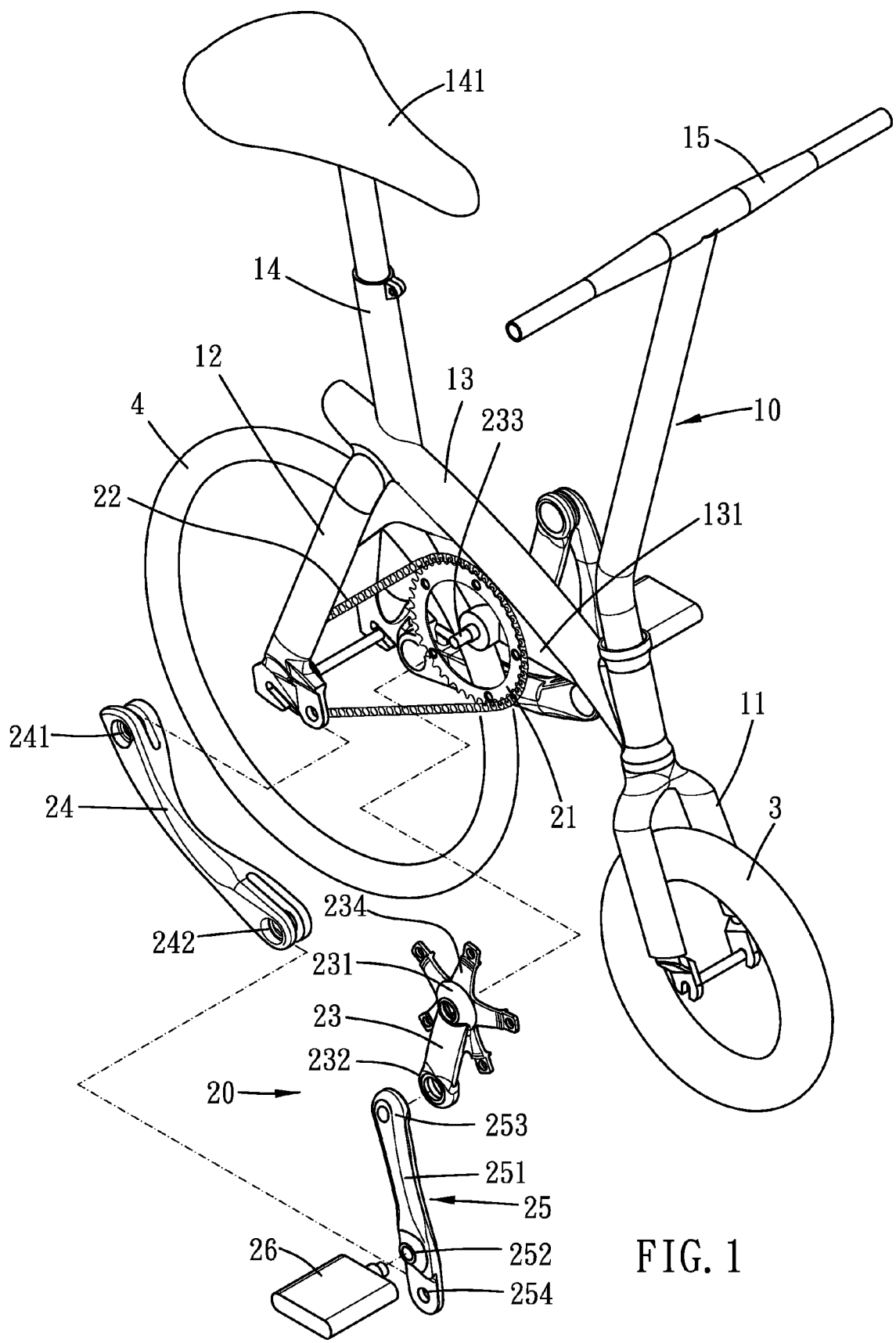
FIG. 1 is a breakdown drawing showing a bicycle of the present invention.
Figure 2:
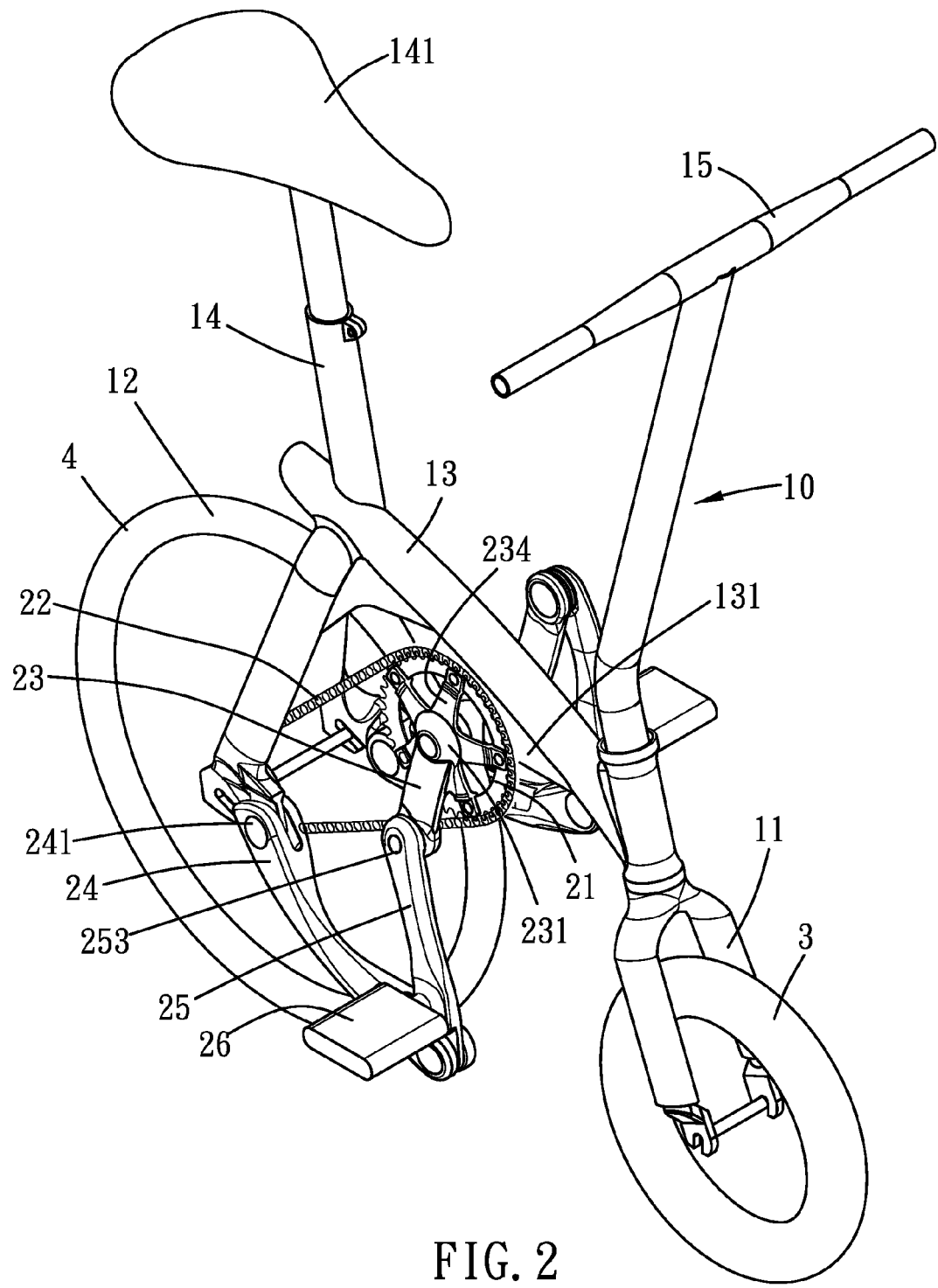
FIG. 2 is a perspective view showing a bicycle of the present invention.
Figure 3:
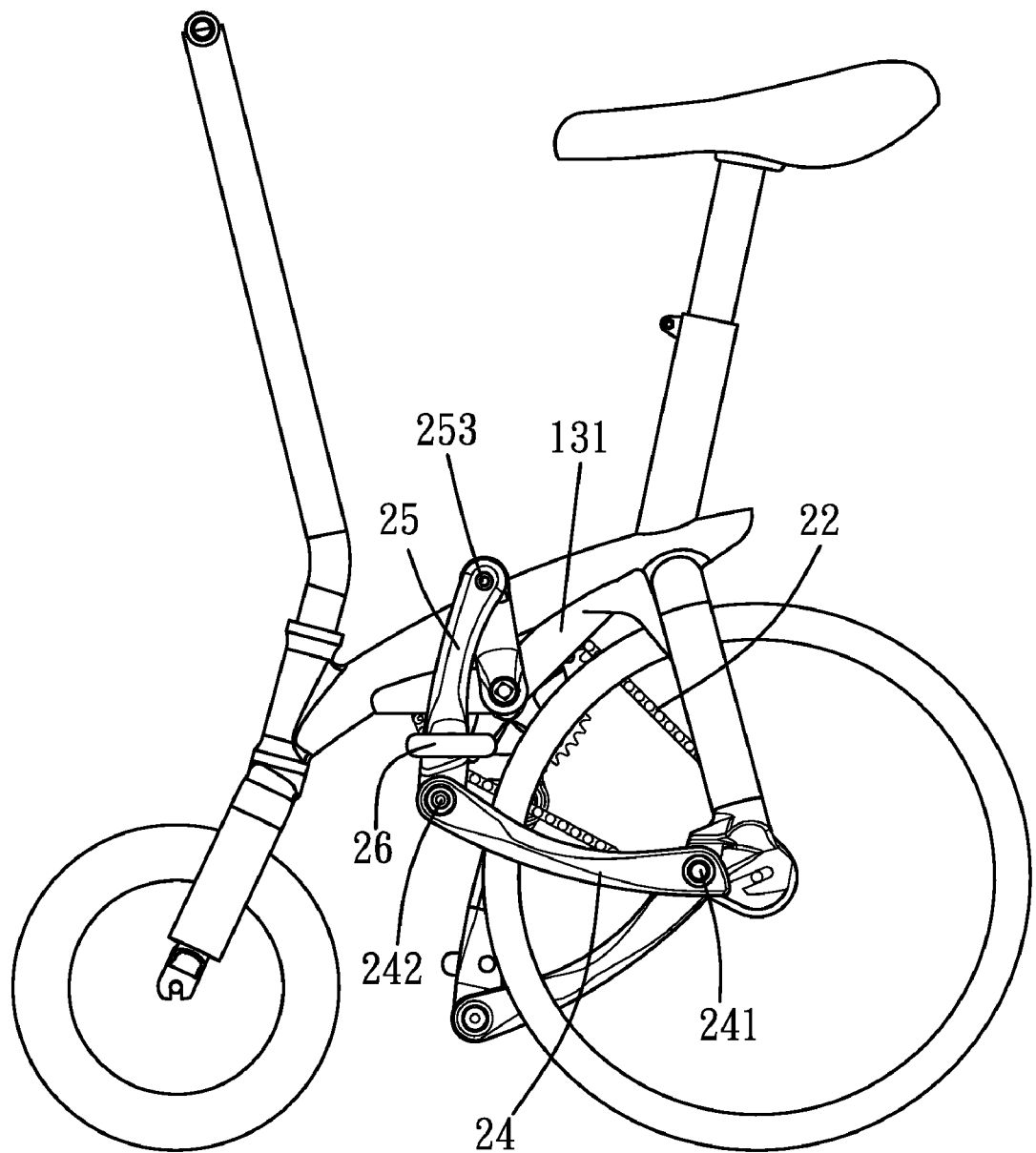
FIG. 3 is a side view showing a bicycle of the present invention.
Figure 4:
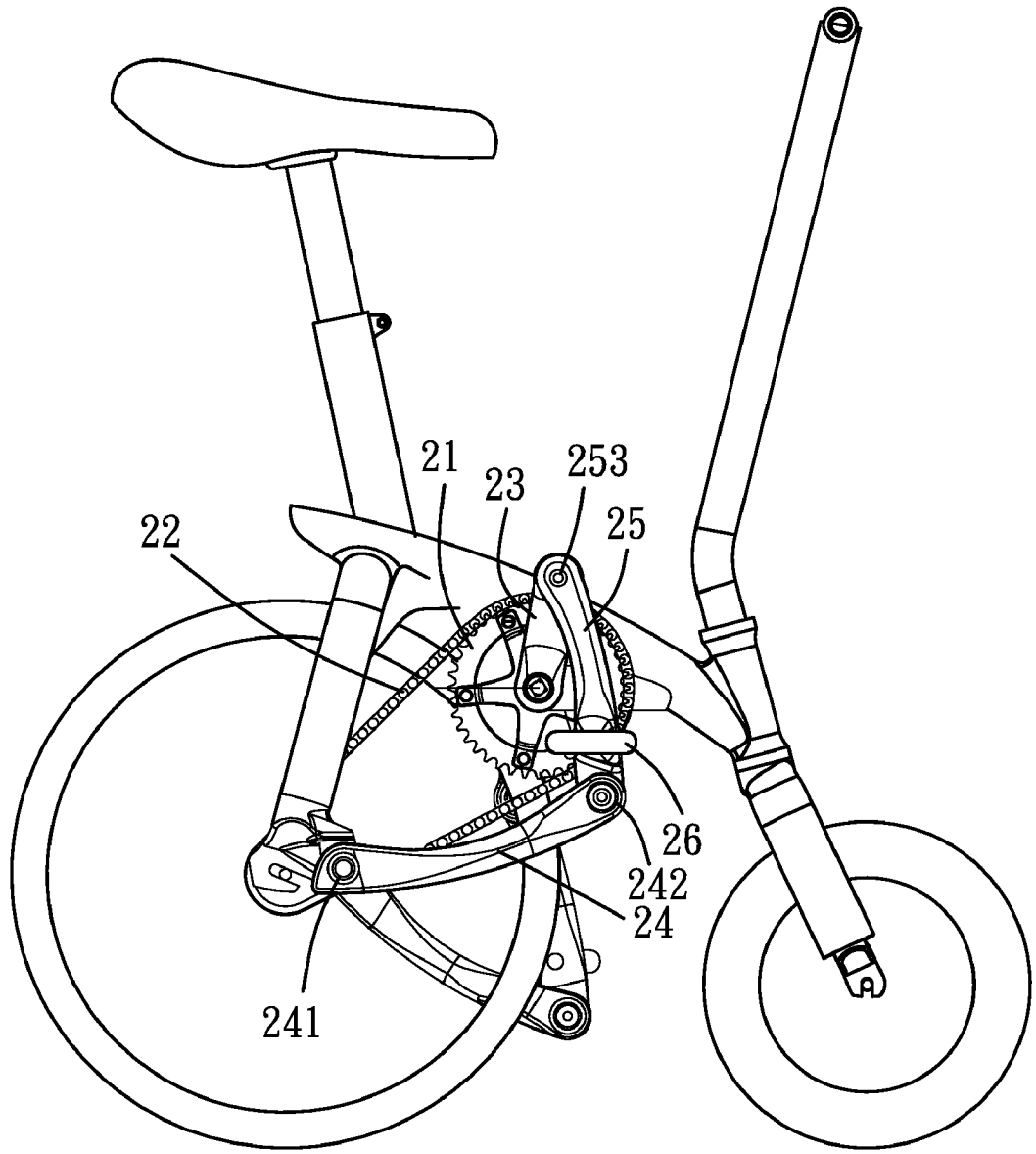
FIG. 4 is another side view showing a bicycle of the present invention.
Figure 5:
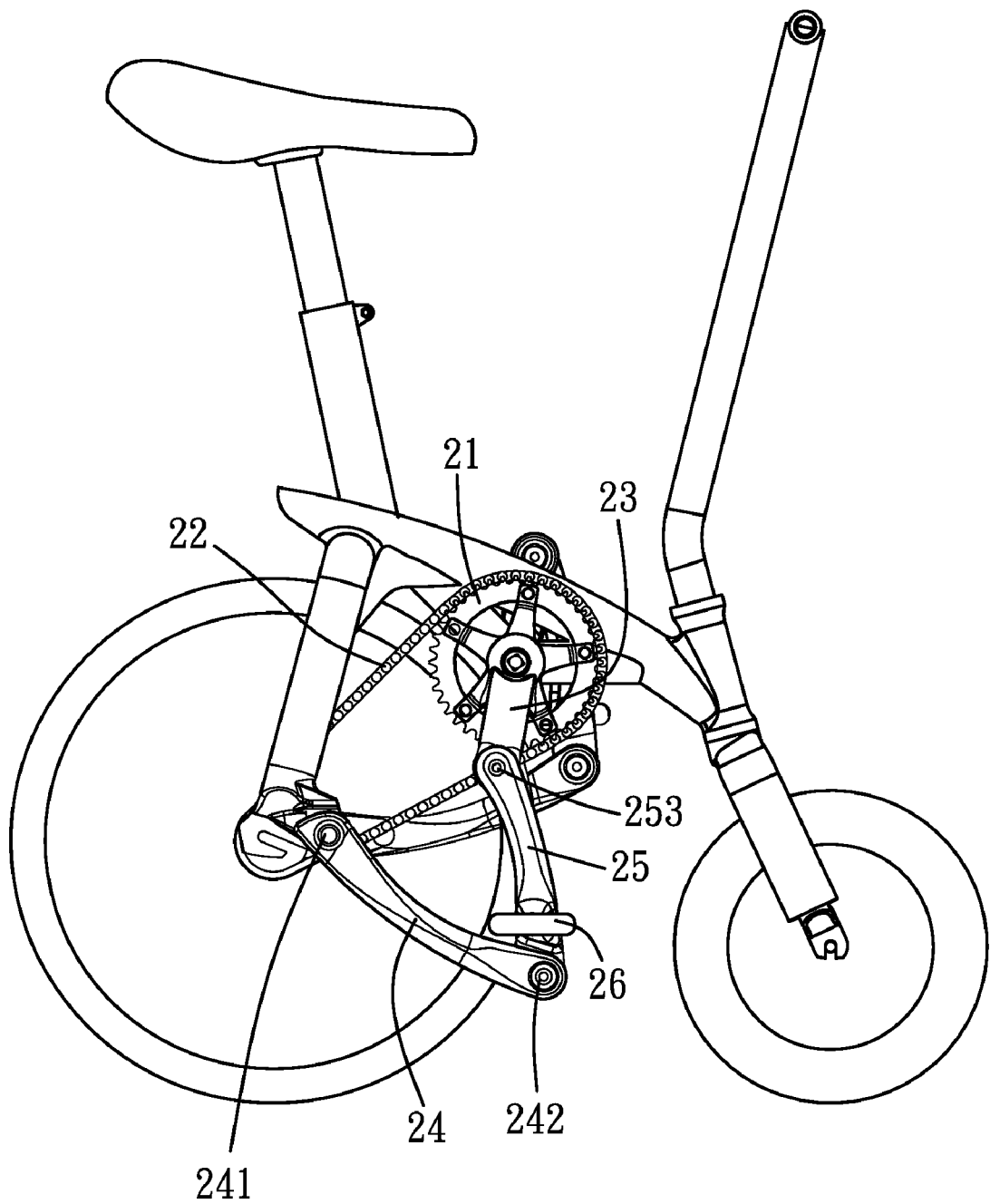
FIG. 5 is another side view showing a bicycle of the present invention, in which the pedals locate at different positions.

Please refer to FIG. 1 to FIG. 5. A bicycle of the present invention includes a frame 10, a front wheel 3, a rear wheel 4 and a driving mechanism 20. The frame 10 includes a front fork 11, a rear fork 12, a tube 13 connecting to the two forks, a seat tube 14 and a handle 15. The front wheel 3 and the rear wheel 4 are disposed on the front fork 11 and the rear fork 12 respectively. The diameter ratio of the front and rear wheels can be varied according to the driving mechanism and other factors.

A saddle 141 is disposed on the seat tube 14. The handle 15 is adapted to control the direction of the front wheel 3 or the rear wheel 4, depending on whether the bicycle is front-wheel-drive or rear-wheel-drive.

The driving mechanism 20 of the present invention includes a transmission disc 21, a transmission belt 22, a pair of cranks 23, a pair of arms 24, a pair of connecting bodies 25 and a pair of pedals 26. The transmission disc 21 is disposed on the frame 10, and the transmission belt 22 partially surrounds the transmission disc 21, so that the transmission disc 21 and the transmission belt 22 are in an operative relationship. Thus the transmission belt 22 is adapted to drive the front wheel 3 or the rear wheel 4. The transmission belt 22 can be a chain or a belt. In the present embodiment, the transmission belt 22 is a chain, and the rim of the transmission disc 21 is formed with a plurality of teeth to engage with the chain. Further, the transmission belt 22 of the present embodiment is used to drive the rear wheel 4, thus the handle 15 is used to control the direction of the front wheel 3. Likewise, when the transmission belt 22 is used to drive the front wheel 3, the handle 15 is correspondingly used to control the direction of the other wheel, i.e. the rear wheel 4. A ratchet hub (not shown) may be further disposed between the transmission belt 22 and the rear wheel 4, so that the transmission belt 22 and the rear wheel 4 can be in a single-direction driving relationship. Also, the driving mechanism 20 may further include one or more speed changer to vary the rotary speed ratio between the transmission disc 21 and the rear wheel 4.

The cranks 23 are disposed on both sides of the frame 10 respectively, and each crank 23 has a crank fixed end 231 and a crank distal end 232. The crank distal ends 232 are connected by an axle 233, which inserts through a center of the transmission disc 21. A bearing may be provided between the axle 233 and the frame 10, and a mounting portion 234 may be provided to connect the crank 23 and the axle 233 with the transmission disc 21. As such, the crank 23 and the transmission disc 21 are in an operative relationship. The axle 233 can be disposed on a sub-tube 131 below the tube 13, as shown in the present embodiment. Or, the axle 233 may be disposed somewhere else on the frame 10, such as the seat tube. Note that no matter where the axle 233 is disposed, the cranks 23 should be rotatable about the axle 233 without boundary, i.e. the crank distal ends can complete a full circular motion. Otherwise the bicycle might have trouble moving forward.

The arms 24 are disposed on both sides of the frame 10 respectively, and each arm 24 has an arm fixed end 241 and an arm distal end 242. Specifically, the arm fixed ends 241 are pivoted to the frame 10. Preferably, the arm fixed ends 241 are pivoted to the front fork 11 or the rear fork 12, and particularly to distal ends of the front fork 11 or the rear fork 12

Each connecting body 25 has two pivoting ends 253, 254, which are pivoted to the crank distal end 232 of the crank 23 at the same side and the arm distal end 242 of the arm 24 at the same side respectively. Each connecting body 25 has a connecting portion 251 between its two pivoting ends 253, 254. Preferably, each connecting portion 251 has several connecting units 252, such as female parts of quick-release elements, along its longitudinal direction. The pedal 26 is thus provided with a male parts of a quick-release element to selectively engage with one of the connecting units 252.

Figure 6:
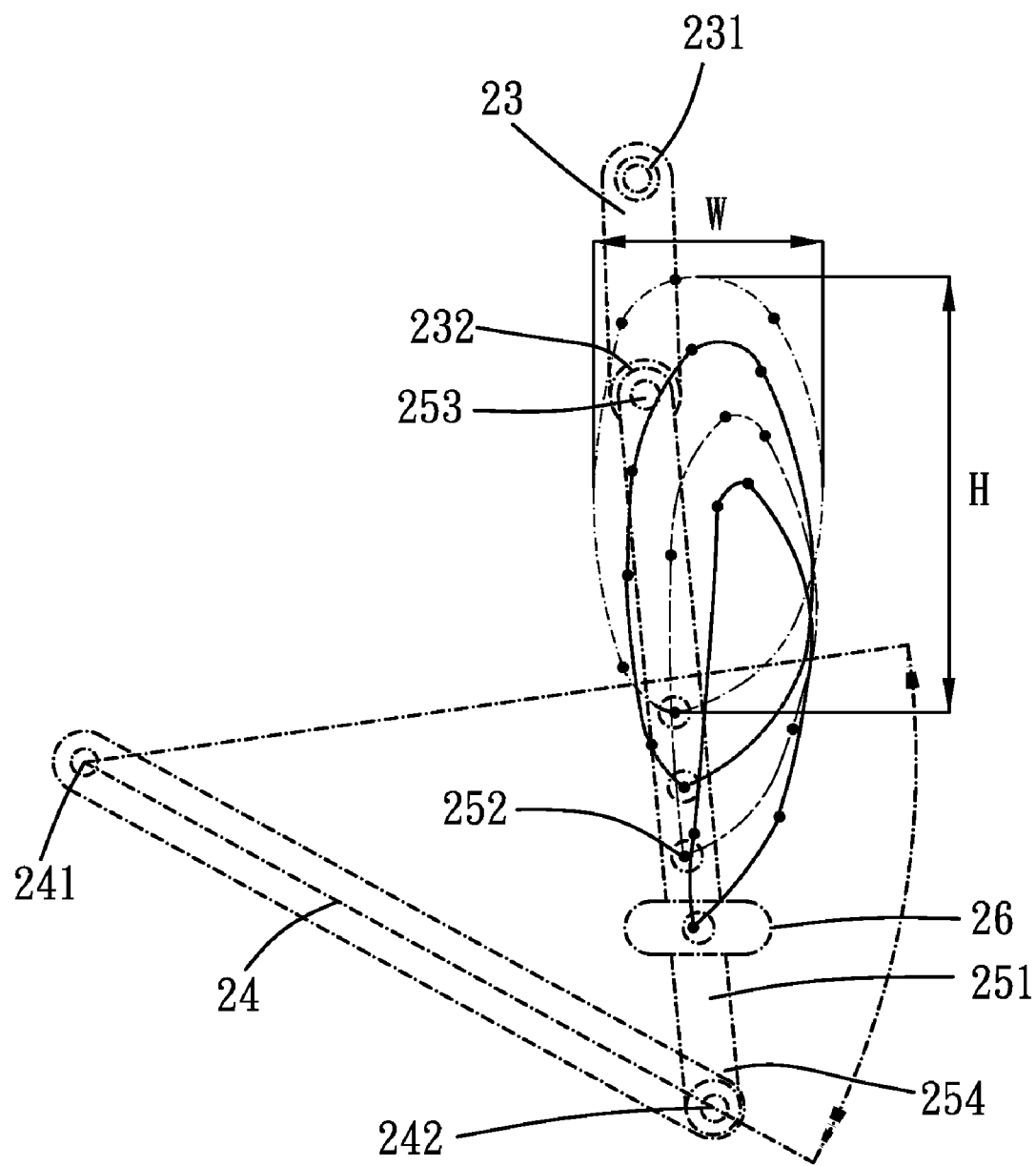
FIG. 6 is a drawing showing possible orbits of a pedal.

Please refer to FIG. 6 for a drawing showing traveling orbits of the pedal disposed on different connecting units. In the present invention, the crank fixed ends 232 can finish a full circular motion, while the arm distal ends 242 are swayable in an arc orbit. Since the connecting bodies 25 is disposed between the distal ends 232 and 242, the connecting units 252 can travel in non-circular orbits. Specifically, a connecting unit 252 closer to the arm distal end 242 will travel in a flatter orbit, and a connecting unit 252 closer to the crank distal end 232 will travel in a rounder orbit. The traveling orbits of the pedals 26 are similar to the orbits of the connecting units 252 where there are installed. Each traveling orbit of the pedal 26 has a topmost point, a bottommost point, a front most point and a rearmost point. A vertical distance between the topmost point and the bottommost point is H, and a horizontal distance between the front most point and the rearmost point is W, which satisfies the following relationship:

$H/W \geq 5/3$.

That is, the vertical drop of the orbit is considerably bigger than the horizontal drop thereof. Hence the space required for the user's feet to exercise can have a shorter horizontal length, and the distance between the front wheel and the rear wheel can also be shortened. As such, the full length of the bicycle is shortened without sacrificing its function.

Other advantages of the present invention are further arisen because the traveling orbits of the pedals are more "vertically extended". For one thing, the user's weight can be more efficiently used to drive the pedal downward. Also, huckle muscles of the user can be more appropriately trained to tighten the hip. In addition, the saddle on the seat tube is not necessary in the bicycle of the present invention and thus can be withdrawn from the frame. Therefore, the weight of the bicycle can be further lowered.

What is claimed is:

1. A driving mechanism for a bicycle, the bicycle having a frame, a front wheel and a rear wheel, the front and the rear wheels being disposed on a front fork and a rear fork of the frame, the driving mechanism comprising:
   a transmission disc, disposed on the frame;
   a transmission belt, a part of the transmission belt surrounding the transmission disc, the transmission belt and the transmission disc being in an operative relationship, the transmission belt being adapted to drive the front wheel or the rear wheel;
   a pair of cranks, disposed on both sides of the frame respectively, each crank having a crank fixed end and a crank distal end, the crank fixed ends being connected by an axle, the axle inserting through a center of the transmission disc, the cranks and the transmission disc being in an operative relationship, each crank being rotatable about its crank fixed end;
   a pair of arms, disposed on both sides of the frame respectively, each arm having an arm fixed end and an arm distal end, the arm fixed ends being pivoted to distal end of the rear fork;
   a pair of connecting bodies, each connecting body having two pivoting ends, which are pivoted to the crank distal end of the crank at the same side and the arm distal end of the arm at the same side respectively, each connecting body further having a connecting portion between its two pivoting ends; and
   a pair of pedals, disposed on the connecting portions of the connecting bodies respectively, each pedal being movable in an orbit, the orbit having a topmost point, a bottommost point, a front most point and a rearmost point, a vertical distance between the topmost point and the bottommost point is H, a horizontal distance between the front most point and the rearmost point is W, which satisfies the following relationship:

$H/W \geq 5/3$.

2. The driving mechanism of claim 1, wherein each connecting portion has several connecting units disposed along its longitudinal direction, each pedal connects to one of the connecting units at the same side.

3. A bicycle, having the driving mechanism of claim 2, the bicycle comprising the frame, the front wheel and the rear wheel, the frame comprising the front fork, the rear fork and a handle, the front wheel connecting to the front fork, the rear wheel connecting to the rear fork, the handle being adapted to control the direction of the front wheel or the rear wheel.

4. The bicycle of claim 3, wherein the handle is adapted to control the direction of the front wheel.

5. The bicycle of claim 3, wherein the frame further comprises a seat tube, a saddle is disposed on the seat tube.

6. The bicycle of claim 5, wherein the axle connecting between the cranks is disposed in front of the seat tube and behind the front fork.

7. The bicycle of claim 3, wherein location of the axle connecting between the cranks is higher than arm fixed ends of the arms.

8. The bicycle of claim 7, wherein location of the axle connecting between the cranks is higher than axles of the front wheel and the rear wheel.

9. A bicycle, having the driving mechanism of claim 1, the bicycle comprising the frame, the front wheel and the rear wheel, the frame comprising the front fork, the rear fork and a handle, the front wheel connecting to the front fork, the rear wheel connecting to the rear fork, the handle being adapted to control the direction of the front wheel or the rear wheel.

10. The bicycle of claim 9, wherein, the handle is adapted to control the direction of the front wheel.

11. The bicycle of claim 9, wherein the frame further comprises a seat tube, a saddle is disposed on the seat tube.

12. The bicycle of claim 11, wherein the axle connecting between the cranks is disposed in front of the seat tube and behind the front fork.

13. The bicycle of claim 3, wherein location of the axle connecting between the cranks is higher than arm fixed ends of the arms.

14. The bicycle of claim 13, wherein location of the axle connecting between the cranks is higher than axles of the front wheel and the rear wheel.

* * * * *